United States Patent [19]

Durand

[11] Patent Number: 6,126,866
[45] Date of Patent: Oct. 3, 2000

[54] MULTISPECTRAL TAILORABLE COATINGS

[75] Inventor: William W. Durand, Edina, Minn.

[73] Assignee: Honeywell International Inc., Morristown, N.J.

[21] Appl. No.: 07/644,428

[22] Filed: Jan. 22, 1991

Related U.S. Application Data

[63] Continuation-in-part of application No. 07/132,621, Dec. 2, 1987, abandoned, which is a continuation-in-part of application No. 06/752,334, Jul. 3, 1985, abandoned.

[51] Int. Cl.[7] .............................. F21V 9/04; G02B 5/20; G02B 1/10

[52] U.S. Cl. ...................... 252/582; 252/584; 252/587; 359/580

[58] Field of Search ................................. 252/582, 584, 252/597; 427/160; 350/1.6, 164, 166, 311; 359/321, 358, 359, 580, 586, 589

[56] References Cited

U.S. PATENT DOCUMENTS

| | | | |
|---|---|---|---|
| 3,219,734 | 11/1965 | Mattin | 350/164 |
| 3,331,699 | 7/1967 | Marshall et al. | 350/164 |
| 3,810,777 | 5/1974 | Boebel et al. | 427/160 |
| 3,876,552 | 4/1975 | Moynihan | 428/328 |
| 4,043,647 | 8/1977 | Oue et al. | 350/341 |
| 4,057,316 | 11/1977 | Hacman et al. | 350/1.6 |
| 4,126,727 | 11/1978 | Kaminski | 350/164 X |
| 4,168,986 | 9/1979 | Venis, Jr. | 106/291 |
| 4,171,390 | 10/1979 | Hilterhaus et al. | 427/160 X |
| 4,229,066 | 10/1980 | Rancourt et al. | 350/1.6 |
| 4,436,363 | 3/1984 | Steinbruegge et al. | 350/1.6 |
| 4,533,593 | 8/1985 | Miyata et al. | 350/164 X |

FOREIGN PATENT DOCUMENTS 2093042  8/1982  United Kingdom .

Primary Examiner—Peter A. Nelson
Attorney, Agent, or Firm—John G. Shudy, Jr.

[57] ABSTRACT

A coating comprised of a broadband transparent binder and multilayer thin film particles is applied to the surface of an object. Each particle has a flat principal surface and the dimensions of the particles are selected so that the flat surface of essentially every particle will align parallel to the nearest portion of the object surface to the particle. There is a leafing or an overlap of the particles parallel to the object surface. The particles form a continuous conformal coating over the object surface. It is preferred that the maximum dimension of the principal surface of each particle be at least 30 microns and, for best results the maximum dimension should exceed 50 microns. Metallic flakes and/or flakes or particles comprised of organic dyes may be included in the coating to further tailor its spectral characteristics. It is preferred that the weight of the particles equals 20 to 40% of the weight of the combination of the particles and the binder.

4 Claims, 3 Drawing Sheets

MULTISPECTRAL TAILORABLE COATINGS

This application is a continuation-in-part of an application having Ser. No. 07/132,621, filed Dec. 2, 1987, now abandoned, which was a continuation-in-part of an application having Ser. No. 06/752,334, filed Jul. 3, 1985, now abandoned.

BACKGROUND OF THE INVENTION

1. Field of the Invention

This invention relates to means and methods of reflecting or transmitting selected electromagnetic wavelengths from or to an object's surface. In particular, this invention relates to coatings which include a plurality of multilayer thin film particles.

2. Related Art

Lamellar pigment particles comprised of a plurality of layers, where adjacent layers have different indices of refraction, have been employed in coatings to reflect light from a surface. However, the quality of these known coatings is insufficient to meet the present day demands for the transmission or reflection of one or more sharp spectral peaks.

When limiting an object's observability, one generally wishes to either (1) reflect very little of a particular wavelength included in an interrogating search beam, such as a laser, but reflect at other wavelengths so that the object matches the background environment, (2) modify an object's thermal radiance by strongly suppressing selected infrared wavelengths, (3) match the emissions from an object to its surroundings by suppressing selected visible, infrared or ultraviolet wavelengths or (4) combinations of the above three techniques. In many cases, the emissions to be suppressed are spectrally narrow and suppression applied outside these narrow bands negates coating effectiveness.

Prior art coatings which incorporate lamellar particles have offered only relatively broad spectral peaks or have caused substantial diffuse reflectance. The prior art means of construction do not allow for the achievement of narrow spectral structures. Such condition does not provide effective observability reduction against current optical sensing techniques.

SUMMARY OF THE INVENTION

The present invention provides multispectral tailorable coatings by providing a plurality of particles wherein each particle has a substantially flat principal surface and the particles are comprised of a multiplicity of layers of different indices of refraction with the thickness of the layers selected to maximize transmission or reflection at particular wavelength(s) or range of wavelengths of interest. The particles are then dispersed throughout a specially prepared binder material which will adhere to and conform to the surface of a selected object while at the same time holding substantially all of the particles with their principal surfaces aligned parallel to the surface of the object, evenly distributed and overlapped. Preferred binders are silicone or urethanes. The preferred ratio by weight of the particles to the combination of binder and particles is 20 to 40 per cent.

The minimum dimension of the principal surface of the particles is at least 30 microns and for best results should be at least 50 microns with an aspect ratio of length to thickness being preferably at least 5 to 1. In one preferred application the minimum dimension of the principal surface is optionally 200 to 300 microns. The binder material must not be absorbing at the wavelength(s) or wavelength range of interest.

Metallic flakes and platelets composed of organic dyes can be intermingled with the multilayered particles as an additive for particular diffusion of specific spectral peaks or absorption of particular wavelengths.

It is an important aspect of the present invention to have nearly every particle held parallel to the object surface to which the coating is applied and to overlap one another to maximize interference effects and to insure sharp spectral peaks around the wavelength(s) or wavelength ranges of interest to result in a greatly coherent reflection or transmittance. Multilayer platelets or particles are needed for a good narrow structure of reflected or transmitted light. A plurality of platelets is required for interference structure in composite coatings such as paints. It is also required for a complete conformal coating of object surfaces, so that no underlying surface is exposed. Interference structure ensures good specific spectral selectivity.

The binder material must be of a particular viscosity and curing rate so that the particles will lie in parallel positions with an even distribution in overlapping positions before the binder cures. However, at the same time the binder cannot be runny to the extent that the binder runs off the surface before curing or that the particles attract one another so as to form clumps resulting in the particles having their principal flat surfaces other than parallel to the object surface and not overleafing one another in even distribution in a fashion as to completely cover the object surface. A most difficult and certainly not obvious achievement has been to ensure that the particles lie with their principal surfaces parallel to the surface being coated and overlap or leaf so as to cover the surface with an even distribution with a binder that has a viscosity neither too high nor too low and having an appropriate curing time.

The present invention is preferably employed as a conformal spray paint for reducing the observability of objects.

DESCRIPTION OF THE PREFERRED EMBODIMENTS

Figure 1:
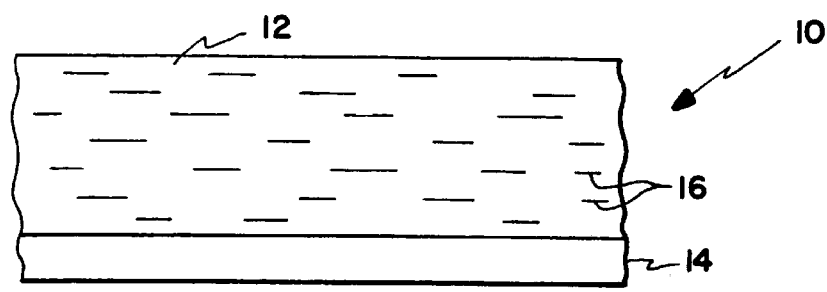
FIG. 1 is a cross-sectional schematic of the spectral tailorable coating of the present invention.
Figure 3:
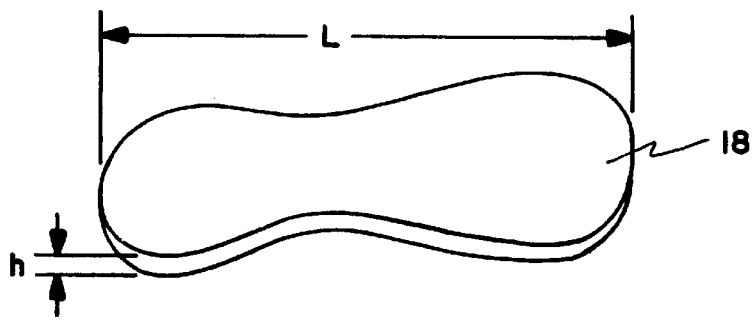
FIG. 3 is a perspective view illustrating the preferred aspect ratios of a multilayer particle.

FIG. 1 shows a multispectral tailorable coating 10 in conformance with the present invention applied to a surface 12 of an object. Coating 10 is comprised of a broadband transparent binder 14 and leafing pigment particles 16. "Leafing" as used herein means that the binder in combination with the particle will align the principal surface 18 (see FIG. 3) of the particles essentially parallel to the surface of the object and also the particles overlap one another so that the complete surface of the object is covered conformally. Yet the particles are not so numerous that they pile up on the object's surface so as to be tilted or not have their principal surfaces parallel to the object's surface. If the surface of the object is curved, the pigment particles in one portion of the coating may of course not be parallel to all other pigment particles since the coating will conform to the surface of the object but each particle's principal surface will be parallel to a plane tangent at each point of location below the respective particle on the curved surface of the object to be coated. Further, it is assumed that the curvature of the object's surface is quite large compared to the maximum dimension of each particle so that it is possible for the particle to lie substantially parallel to that portion of the surface of the object 12 which is nearest to the particular particle. Further, "leafing" means that the binder contacts the entire particle, allowing for a uniform dispersion in the binder before and after coating. A uniform particle dispersion is crucial in achieving total coverage of an object when coated.

Figure 2:
FIG. 2 is an enlarged side view of one of the multilayer particles dispersed within the binder material of the present invention.

FIG. 2 shows an enlarged side version of one of the pigment particles 16. Pigment particle 16 is preferably a multilayer thin film particle. Particle 16 is produced by formulating a thin film on a substrate, releasing the film from the substrate and reducing the film (by milling for example) to the preferred size. Care must be taken in reducing particle size, so as not to fracture the platelets along one of the parallel interfaces. The thickness t of the various layers within the thin film is preferably $\lambda/4$ n where: $\lambda$ is the wavelength or wavelength range to be reflected, and n is the index of refraction of the particular layer of material (nt being the optical thickness of the layer). It is preferred that each particle have many layers of alternating refractive index since the more layers the more reflection can be increased for the wavelength(s) of interest.

It has been discovered that the particle is preferably in the form of a flake (see FIG. 3) having a flat principal surface 18 with a minimum dimension of at least 30 microns and a ratio (i.e., the aspect ratio) of the minimum dimension of the flat principal surface 18 to the thickness h of the flake being at least 5:1 for adequate leafing. The maximum dimension of the principal flat surface 18 of some particles for certain applications will be several hundred microns. In order to maintain the proper aspect ratio, clearly the thickness of the particle will be limited or the maximum dimension of the principal surface will be increased.

Leafing is best achieved if the maximum dimension of the principal surface is at least 50 microns with the preferred aspect ratio maintained.

It has been discovered that when these preferred ranges are not employed, a percentage of the particles sufficient to substantially degrade the sharpness of the spectral peak are misaligned, i.e., not parallel to one another and to the object's surface, and not sufficiently overlapped in the binder material 14. That is, it has been discovered that the leafing of the pigment particles is a critical feature in order to provide multispectral tailorable coatings where the spectral peaks of the wavelength(s) or wavelength ranges of interest are sufficiently sharply defined and reflection and transmittance are coherent relative to a wavefront of light for the above described applications, and that certain dimensions are important in achieving leafing.

It is another important aspect of the present invention to provide a binder material 14 which will not absorb at any of the wavelength(s) or wavelength ranges of interest, in order to ensure that maximum reflectance or transmittance of those wavelengths or wavelength ranges will occur.

Figure 4:
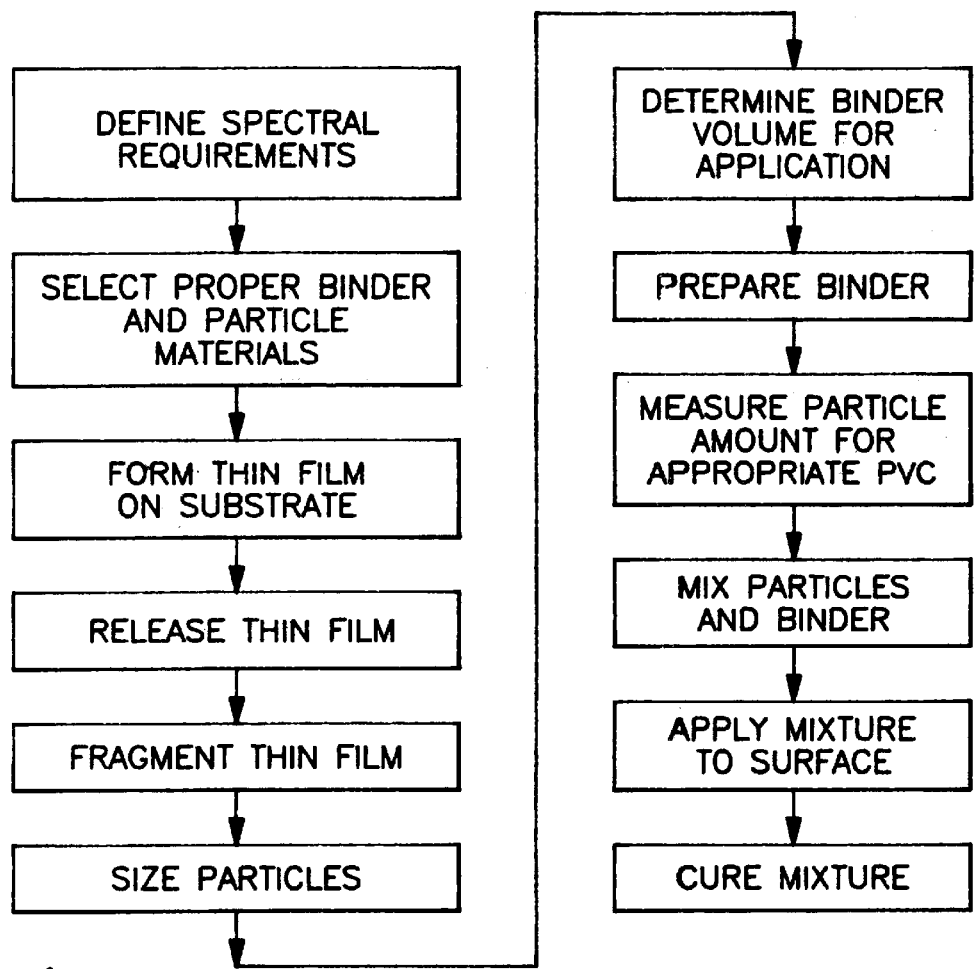
FIG. 4 is a diagram of the steps involved in the method of the present invention.

FIG. 4 sets forth the steps of making the present invention. Fabrication of a multilayer pigment material begins by using appropriate growth techniques, such as vacuum vapor deposition. Pigment material is subsequently obtained through release of the multilayer deposit from the growth substrate. This can be performed, for example, by selective etching at the coating/substrate interface. Released material is preferably milled to reduce particle size. Milling will stop when the multilayer particles reach the desired size sufficient to accomodate desired spectral properties and yet ensure leafing. The physical hardness of the milling media must be optimized for each pigment type and size. It has been found that relatively small ball-type media (i.e., 0.1 to 1.0 inch diameter) perform best. The particles 16 are mixed with binder medium 14. The binder medium may be, for example, any one of many but carefully selected broadband transparent organic based compounds. With such binders, application to the surface 12 can be performed using conventional means such as spraying. Nozzle orifices, of course, must be of a size adequate to pass the largest pigment particles.

For optimum results the ratio by weight of the pigment material (whether multilayered flakes 16, or metal flakes and powdered particles) to the weight of the mixture of pigment material and binder 14 (this ratio is generally known as pigment volume concentration or PVC) should be 20 to 40 per cent. At a lower PVC, it was found that too few flakes 16 were available to reflect adequately and at a higher PVC, too little binder was available to contact or wet the flakes 16 and cement the coating 10 together.

A PVC of 20–40% was empirically derived. Within this range, the exact PVC chosen will be highly application dependent. Further, the ratio of the various pigment materials to one another will be highly application dependent.

It was found that once formulated, the spectral characteristics of coating 10 were substantially invariant over a broad range of thicknesses.

Regarding the preferred aspect ratio of flake 16, if the aspect ratio is too small the flakes were found to leaf poorly, tended to break up during processing (e.g., split along an interface between layers) and gave poor optical performance. A range of 6:1 to 11:1 in aspect ratio led to good results together within appropriate binder. Again, some adjustment for specific applications is desirable.

FIG. 4 shows the order of steps for implementing the invention. The spectral requirements of the application are defined prior to selecting the appropriate binder and particle materials. After selection of the materials, the thin film for the particles is formed on and released from a substrate. The film is fragmented and sized into particles having proper dimensions including aspect ratio. The volume of the selected binder is determined just before its preparation. The amount of particles required is established for the appropriate PVC and the particles are mixed with the prepared binder. The resulting mixture is applied to a surface having the spectral requirements. Finally, a successful curing of the mixture is achieved.

An example of the composition and preparation of a lamellar particle paint coating 10 in accordance with the present invention is as follows.

The batch size was determined. A 35% PVC was selected. The lamellar material was composed of flakes of an infrared reflection coating. The coating had 25 alternating layers of lead fluoride ($PbF_2$) and zinc sulphide (ZnS). Each layer was one quarter wavelength optical thickness at the design wavelength (i.e., approximately 10 microns). This particular design gave a relatively narrow, high reflectance band centered at the infrared design wavelength with low reflectance at other wavelengths of interest.

The lamellar material was deposited by standard vacuum deposition techniques on a glass substrate and was released by several thermal shock cycles. The lamellar material was fragmented by the release process. It was then hand milled to give a nearly uniform population of particles 16 that were approximately 200 to 300 microns across (i.e., minimum dimension of principal surface 18) and 30 microns thick.

The particles 16 were then mixed with a GE SR-125 silicone binder by hand stirring. The mixture was diluted 25% using xylene solvent and spray applied to a substrate primed with a dark primer. The primer was compatible with the binder/solvent and had low infrared reflectance, so that any reflectance measured would be due to the flake content of the coating 10.

An airbrush was used to apply the coating 10. The sprayed substrates were air dried and cured for four hours at 150° F. Infrared spectral reflectance was measured after curing. These measurements revealed spectral performance which was substantially the same as the thin film alone deposited on glass. Peak reflectance was reduced somewhat (20 to 30%) but the spectral shape and characteristics were nearly identical.

The orifice of the spray applicator must be larger than the maximum dimension of principal surface 18 of the flakes 16. Also, frequent shaking of the spray applicator is very helpful in ensuring uniform distribution of the flakes 16 since they tend to settle rapidly within the mixture.

When minimizing infrared absorption, silicone or urethane are the preferred binder materials 14. They also provide a durable coating. General Electric SR-125 is the preferred silicone. Most urethanes will suffice with no particular urethane being preferred. Partially fluorinated urethanes decreased infrared absorptance as compared to non-fluorinated urethanes.

Other binder mediums such as acrylics, methacrylates, etc. had high infrared absorptance. Although a broader range of binders is available if infrared performance is unimportant, silicone and urethane provide nearly the widest wavelength range of transparency and thus are generally preferred as the binder for a multispectral tailorable coating.

Metal flakes (e.g., aluminum), powdered pigment particles and/or dye solutions can be added to the pigment material to vary the optical properties of the coating 10 if desired. The dimensions of the metal flakes should follow the guidelines above for lamellar particles. Toluene or xylene are typically used to thin silicone or urethane binders to prepare coating 10 for spray application. The binders are typically diluted 25 to 50%. The thinners volatize upon curing and are thus not incorporated in the cured coating. Nevertheless, the reduction in viscosity of the mixture sprayed on surface 12 impacts the physics controlling the orientation or leafing of the particles 16, therefore, for best results the dilution process must be controlled and the range disclosed herein is preferred.

Milling to reduce dry particle size can be done by hand with a mortar and pestle but for large quantities bulk ball or sand milling is an acceptable approach. Milling after mixing the flakes 16 with the binder 14 is also possible.

Several different multilayer thin film particles can be mixed together to provide spectral selectivity for different wavelengths. In fact, the present invention allows one to employ the rich variety and precise control of multilayer thin film technology to large scale coating and low observables problems.

Figure 5A:
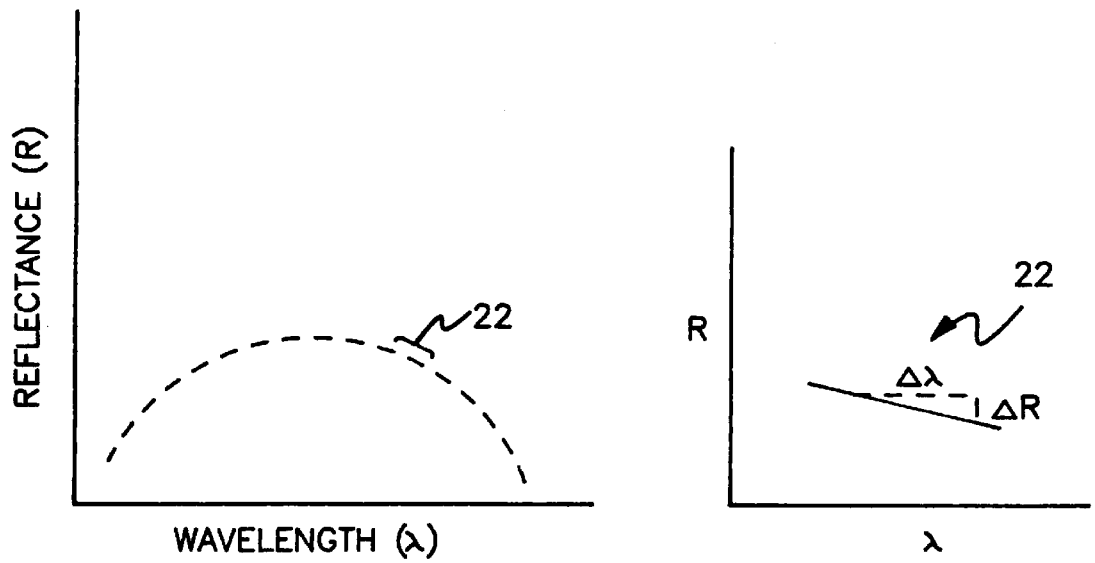
FIGS. 5a and 5b contrast spectral reflectance of the related art with that of the present invention
Figure 5B:
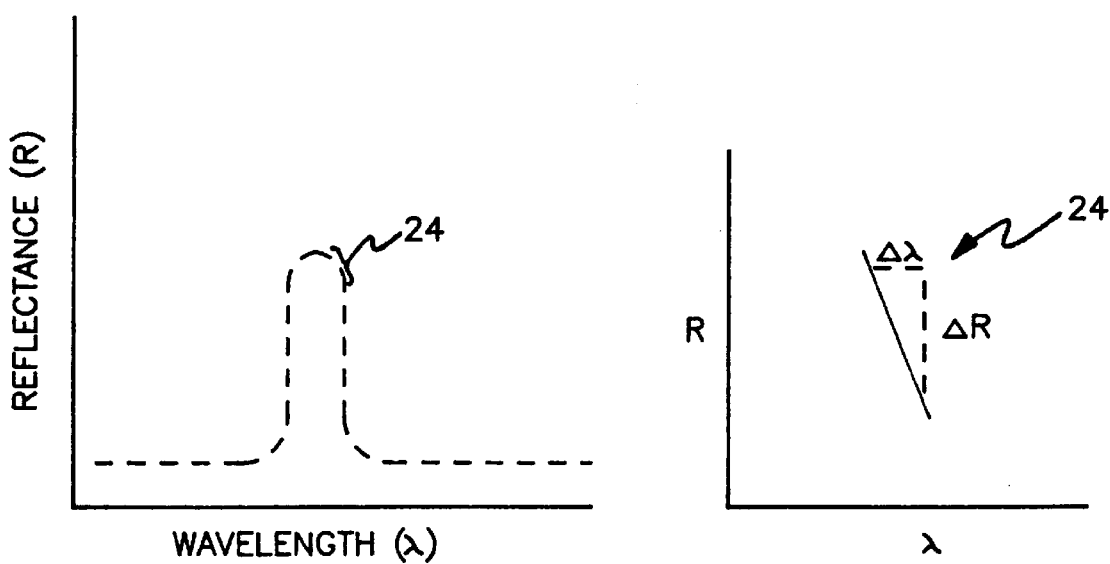

FIG. 5a shows the spectral properties of the related art. The related art involves broad spectral reflection (R) of light. The spectral structure 22 is necessarily broad, i.e., the change of reflection ($\Delta R$) relative to the change of wavelength ($\Delta \lambda$) is low. FIG. 5b reveals the spectral properties of the present invention. The spectral structure 24 is narrow. The present invention provides very significant spectral selectivity, i.e., $\Delta R/\Delta \lambda$ is high between the structure maximas and minimas and can be high (abrupt) or low (gradual) elsewhere, in that there is at least one narrow spectral band of substantial transmittance or reflection.

The above discussion has focused on maximizing reflection. However, the reflective coatings will have large regions which transmit many wavelengths. If one desires, the above coatings can be easily tailored to transmit at the wavelengths of interest, having the same characteristics of reflection in the present invention as described above.

What is claimed is:

1. A reflective material, having a tailored spectrum, coated on a regular or irregular surface of an object, comprising:
   a broadband transparent binder applied to the surface; and
   a plurality of leafed lamellar platelets in said binder, said binder having a weight ratio of 0.2 to 0.4 for weight of said plurality of platelets to weight of a combined mixture of said binder and said plurality of platelets
wherein:
   each platelet of said plurality of platelets
      each platelet has a maximum surface approximately parallel to the layers and the maximum surface has a minimum dimension of at least 50 microns and comprises a plurality of layers of various materials and each platelet has a ratio of the minimum surface dimension to a thickness dimension of at least five to one, and each layer of said plurality of layers has a thickness of a quarter wavelength divided by an index of refraction of the layer;
   each wavelength is of the tailored spectrum and said binder is transparent to each wavelength;
   reflection of the wavelength has a narrow spectral structure having a high change of reflection to a low change of wavelength with substantially no diffuse reflection and substantially all mirror-like reflection;
   the layers of each platelet are all substantially parallel to the coated surface nearest to each platelet; and
   said plurality of platelets completely covers the coated surface.

2. Material of claim 1 wherein said binder is a urethane.

3. Material of claim 1 wherein said binder is a silicone.

4. Material of claim 3 wherein said binder is the silicone diluted about 25% by a use of a xylene solvent.

* * * * *